(12) United States Patent
Nakamura et al.

(10) Patent No.: US 6,812,467 B2
(45) Date of Patent: Nov. 2, 2004

(54) APPARATUS FOR READING IMAGES FROM PHOTOGRAPHIC FILM

(75) Inventors: Shigetaka Nakamura, Wakayama (JP); Koji Arikawa, Wakayama (JP); Hidekazu Tsuji, Wakayama (JP); Kazuhiro Kobayashi, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 0 days.

(21) Appl. No.: 10/303,658

(22) Filed: Nov. 25, 2002

(65) Prior Publication Data

US 2003/0127597 A1 Jul. 10, 2003

Related U.S. Application Data

(63) Continuation of application No. 09/710,765, filed on Nov. 9, 2000.

(30) Foreign Application Priority Data

Nov. 12, 1999 (JP) .......................................... 11-321926
Nov. 29, 1999 (JP) .......................................... 11-337806
Nov. 29, 1999 (JP) .......................................... 11-337807

(51) Int. Cl.[7] ................................................. G01J 5/02
(52) U.S. Cl. ................................. 250/341.1; 250/252.1
(58) Field of Search ........................... 250/341.1, 252.1

(56) References Cited

U.S. PATENT DOCUMENTS 4,520,388 A * 5/1985 Kellie ......................... 348/136
6,094,281 A * 7/2000 Nakai et al. ................. 358/512
6,219,463 B1 * 4/2001 Hyodo ......................... 382/298
6,339,483 B1 * 1/2002 Hoshino et al. ............. 358/487

FOREIGN PATENT DOCUMENTS

JP 05-020445 1/1993
JP 06-266877 9/1994

* cited by examiner

Primary Examiner—Constantine Hannaher
Assistant Examiner—Shun Lee
(74) Attorney, Agent, or Firm—Fulbright & Jaworski L.L.P.

(57) ABSTRACT

An apparatus for reading images of a photographic film disposed on an image reading optical path, with a light source (31a) for emitting visible light and infrared light into the image reading optical path to irradiate the photographic film, and a zoom lens unit (32a) for the visible light and infrared light irradiating the photographic film. A visible light sensor and an infrared light sensor are disposed separately for detecting a visible image based on the visible light from the zoom lens unit, and for detecting an infrared image based on the infrared light from the zoom lens unit, respectively. A focal position varying transparent element (FT) is provided for shifting a focal position of the zoom lens unit along an optical axis. The transparent element is movable to and from a position between the zoom lens unit and infrared light sensor to correct variations in the focal position occurring with variations in magnification of the zoom lens unit.

5 Claims, 7 Drawing Sheets

APPARATUS FOR READING IMAGES FROM PHOTOGRAPHIC FILM

This application is a continuation of application Ser. No: 09/710,765 filed Nov. 9, 2000.

BACKGROUND OF THE INVENTION

1. Field of the Invention

This invention relates to an apparatus for reading images from a photographic film disposed on an image reading optical path.

2. Description of the Related Art

An apparatus for reading images from photographic film is known as a film scanner which irradiates the film with light from a light source. Images recorded on the film are read usually by detecting light transmitted through the film with a CCD sensor or the like.

The primary function of the photographic film reading apparatus is to read images from photographic film as noted above. In recent years, however, it has been proposed to improve image quality by detecting also scratches or dust made or adhering to the photographic film as images, determining positions of the scratches or dust on the film, and correcting photo images affected by the scratches or dust.

A technique for detecting such scratches and dust on photographic film is disclosed in U.S. Pat. No. 5,266,805 (correspondence to Japanese Patent Laying-Open Publication H6-28468), for example. According to this prior technique, scratches and dust on photographic film are identified from an image read from the film by using infrared light and an image read from the film by using visible light. This technique, in general, utilizes phenomena that visible light is modulated both by an image recorded on photographic film and by scratches and dust made or adhering to the film, whereas infrared light is modulated by the scratches and dust through scattering, but is not influenced by the image on the film.

A similar technique for detecting such scratches and dust on photographic film is disclosed in Japanese Patent Laying-Open Publication H9-163133. This technique uses dark field illumination instead of infrared light illumination.

An image other than one acquired by visible light is required to detect scratches or dust on photographic film. In the former of the conventional techniques, light for irradiating photographic film is successively switched by means of a rotating filter between visible light and infrared light. A visible image and an infrared image are obtained at different points of time. In the latter technique, an optical system for obtaining a visible image and one for obtaining an image different from the visible image are arranged in separate locations to obtain the two types of images sequentially.

However, each of the above prior techniques detects a visible image and a different image (infrared image) at different points of time, which results in an extended time required for detecting the images. Where two optical systems are arranged in separate locations, the two types of images could be associated in an inaccurate positional relationship. Further, the two separate optical systems have the drawback of enlarging an apparatus configuration.

SUMMARY OF THE INVENTION

This invention has been made having regard to the state of the art noted above, and its object is to provide a photographic film image reading apparatus for detecting a visible image and an infrared image speedily, while enabling an accurate determination of a positional relationship between the two images.

The above object is fulfilled, according to this invention, by an apparatus comprising a visible light sensor for detecting a visible image based on visible light irradiating a photographic film, and an infrared light sensor for detecting an infrared image based on infrared light irradiating the photographic film. The visible light and infrared light are emitted from a light source to travel simultaneously along an image reading optical path and irradiate the photographic film.

The light source emits visible light and infrared light so that the two types of light concur in the film image reading optical path to irradiate the photographic film. The visible light sensor detects a visible image of the photographic film, while the infrared light sensor detects an infrared image thereof.

With this construction, since visible light and infrared light concur in the film image reading optical path, a visible image and an infrared image of the photographic film may be acquired by a single photometric stage, and that at the same time. Thus, a photographic film image reading apparatus is provided which is capable of detecting both a visible image and an infrared image promptly while accurately determining a positional relationship between the two images.

In an embodiment of this invention, the visible light sensor and infrared light sensor are disposed in different positions, the film image reading optical path including an optical path branching unit for directing the light emitted from the light source toward the visible light sensor and the infrared light sensor. Preferably, the optical path branching unit is arranged to direct the visible light toward the visible light sensor and the infrared light toward the infrared light sensor.

With this construction, the optical path branching unit disposed on the film image reading optical path directs the visible light toward the visible light sensor, and the infrared light toward the infrared light sensor.

The visible light sensor which detects visible images and the infrared light sensor which detects infrared images have a similar construction as sensors, and may therefore be integrated. However, a system that handles both visible images and infrared images is not necessarily common. It is difficult to manufacture an image reading sensor integrating an infrared light sensor and a visible light sensor at low cost.

Thus, the optical path branching unit is placed on the film image reading optical path as described above. This enables the visible light and infrared light to concur in the same optical path even where the visible light sensor and infrared light sensor are separate entities.

As a preferred embodiment for directing the visible light toward the visible light sensor and the infrared light toward the infrared light sensor, it is proposed that the optical path branching unit be formed of a cold mirror. A cold mirror is often used as a reflector for a lamp to reflect visible light and pass infrared light in order to avoid overheating of an illuminating optical path. Design load may be lightened by utilizing an existing cold mirror as the optical path branching unit.

It is advantageous to provide an infrared light cut filter between the cold mirror and the visible light sensor. Where the cold mirror is used to reflect visible light, part of infrared light could mix into the light reflected by the cold mirror. Such part of infrared light may be intercepted reliably by the infrared light cut filter to prevent overheating of the visible light sensor and detect visible images properly. Moreover, this infrared light cut filter is disposed in a portion of the optical path used only for guiding the visible light. Thus, a conventional infrared light cut filter may be used as it is, without increasing design load.

In a preferred embodiment of this invention, the image reading optical path includes an infrared light cut filter and a light adjustment filter arranged between the light source and the photographic film, the light adjustment filter adjusting the light to a predetermined color balance before irradiating the photographic film. Wavelength characteristics of light transmittance of the infrared light cut filter and the light adjustment filter combined allow transmission of infrared light in a set wavelength range, and cut infrared light outside the set wavelength range, in order to enable image detection by the infrared light sensor.

Not only an infrared light cut filter but a light adjustment filter usually is designed to intercept infrared light. In order to detect an infrared image of photographic film, the infrared light cut filter and light adjustment filter of such design must be removed from the film image reading optical path. Otherwise, these filters will impede detection of the visible image of the photographic film, and cause overheating of components arranged on the optical path. Thus, in order to enable image detection by the infrared light sensor, the wavelength characteristics of light transmittance of the infrared light cut filter and light adjustment filter combined are made to allow transmission of infrared light in a set wavelength range, and cut infrared light outside the set wavelength range. The infrared light of wavelengths not required by the infrared light sensor is cut. Consequently, the photographic film image reading apparatus intended to detect infrared images can prevent overheating of the photographic film and optical elements. In cutting the infrared light outside the set wavelength range noted above, it is not absolutely necessary to intercept all infrared light outside that wavelength range. A wavelength range may be set properly for cutting infrared light to restrain temperature increases of the optical elements within a permissible range. In addition, the characteristics for cutting such infrared light may be realized by the combination of the infrared light cut filter and light adjustment filter. Both of the filters need not have infrared light cutting characteristics.

It should be, noted here that the photographic film image reading apparatus, in reality, is required to cope with varied sizes of photographic film and varied print sizes. Thus, there exist strong demands for the visible light sensor to read images of the photographic film in various magnifications. Where reading magnification on the visible light sensor system side is made variable, lens power on the infrared light sensor system side must also be made variable to form the images of the photographic film on the light-receiving plane of the infrared light sensor in a corresponding relationship to the visible images.

Such a variable magnification lens, typically, is a zoom lens. The zoom lens is designed to have a fixed focal position regardless of magnifications. However, such a design is made by taking visible light into account. Inventors herein have found that, when infrared images are read by using such a lens optimized with respect to visible light, the wavelength dependence of refractive index results in excessive variations in the focal position occurring with variations in the magnification of the lens, thereby blurring the images. It is conceivable in this case to construct the infrared light sensor movable in the direction of the optical axis when the magnification is varied, to absorb the variations in the focal position. However, a complicated construction is required to move the infrared light sensor in the direction of the optical axis with high precision.

In another aspect of this invention, an apparatus of simple construction is provided which is capable of reading an excellent infrared image where lens power is variable. This apparatus comprises a light source for emitting visible light and infrared light into an image reading optical path to irradiate a photographic film, a zoom lens unit for the visible light and infrared light irradiating the photographic film, a visible light sensor for detecting a visible image based on the visible light from the zoom lens unit, an infrared light sensor for detecting an infrared image based on the infrared light from the zoom lens unit, and a focal position varying transparent element for shifting a focal position of the zoom lens unit along an optical axis, the focal position varying transparent element being movable to and from a position between the zoom lens unit and the infrared light sensor, wherein variations in the focal position occurring with variations in magnification of the zoom lens unit are corrected by movement of the focal position varying transparent element.

With this construction, when the magnification of the lens is varied to form an image of the photographic film on the light-receiving plane of the infrared light sensor, the focal position varying transparent element is moved to or from the position between the zoom lens unit and the infrared light sensor to shift the focal position along the optical axis.

The focal position is shifted by the focal position varying transparent element by an amount corresponding to a variation in the focal position due to a variation in the magnification of the lens. In this way, variations in the focal position occurring with variations in the magnification of the lens are corrected by movement of the focal position varying transparent element. Consequently, even when the magnification of the lens is varied, the focal position is present steadily on the light-receiving plane of the infrared light sensor. Infrared images are read reliably by a simple construction for moving the focus position change transparent element.

In a preferred embodiment of this invention, the focal position varying transparent element is formed of sheet glass. When the magnification of the lens is varied, this sheet glass is moved to or from the position between the lens and infrared light sensor.

When the sheet glass is inserted between the lens and infrared light sensor, the focal position shifts away from the lens, approximately depending on the refractive index and thickness of the sheet glass. Thus, the sheet glass is set to have a refractive index and thickness for shifting the focal position away from the lens by a distance corresponding to a variation in the focal position occurring with a variation in the magnification of the lens. In this way, variations in the focal position due to variations in the magnification of the lens may be corrected.

An aberration may be caused by the sheet glass placed between the lens and infrared light sensor. It is noted, however, that variations in the focal position due to variations in the magnification result in no serious aberration. Based on this perception, the focal position varying transparent element is formed of such a simple element as sheet glass.

A slight disagreement inevitably occurs with the position of an identical object (or identical part) in an image on photographic film, between image information acquired with the visible light sensor and image information acquired with the infrared light sensor. This invention proposes an apparatus and method set out hereinafter as a technique for rectifying this disagreement in a simple way.

The apparatus comprises a light source for emitting visible light and infrared light into an image reading optical path to irradiate a photographic film, a lens unit for the visible light and infrared light irradiating the photographic film, a visible light sensor for detecting a visible image based on the visible light from the lens unit, an infrared light sensor for detecting an infrared image based on the infrared light from the lens unit, a calibration chart having images recorded thereon to be readable with infrared light, the calibration chart being movable to and from a position for reading the photographic film, and a positional relationship determining device for determining, based on the images of the calibration chart read by the infrared light sensor, a positional relationship on images of the photographic film between image information acquired from the visible light sensor and image information acquired from the infrared light sensor.

The method comprises the steps of setting a calibration chart having images recorded thereon to be readable with infrared light to a position for reading the photographic film, forming images of the calibration chart on light-receiving planes of both a visible light sensor and an infrared light sensor through a lens unit, and determining a positional relationship on images of the photographic film between image information acquired from the visible light sensor and image information acquired from the infrared light sensor, by comparing image information on the calibration chart read by the visible light sensor and image information on the calibration chart read by the infrared light sensor.

When reading a visible image and an infrared image of photographic film, the calibration chart having images recorded thereon to be readable with infrared light is placed in the position for reading the photographic film. The images of the calibration chart read by the infrared light sensor are used to determine a positional relationship on the images of the photographic film between image information acquired with the visible light sensor and image information acquired with the infrared light sensor.

That is, Inventors have found that a slight displacement between image information acquired from the visible light sensor and image information acquired from the infrared light sensor is caused by a slight difference in magnification of the lens between a region of visible light and a region of infrared light. The displacement is corrected by detecting the slight difference in magnification with the calibration chart.

The images recorded on the calibration chart may have a length serving as a reference, for example. A magnification for the infrared light sensor may be determined accurately based on what length is detected by the infrared light sensor of the images having the reference length. It is not necessary to use the calibration chart for an accurate determination of the magnification on the visible light sensor side.

It is proposed as a preferred embodiment that the calibration chart is readable also with visible light, the positional relationship determining device determining a positional relationship on the images of the photographic film between image information acquired from the visible light sensor and image information acquired from the infrared light sensor, by comparing image information on the calibration chart read by the visible light sensor and image information on the calibration chart read by the infrared light sensor. That is, the positional relationship between visible image and infrared image is determined by using the images of the calibration chart acting as the reference read by both the visible light sensor and infrared light sensor. Thus, the visible image and infrared image are associated with increased accuracy.

In a preferred embodiment, the calibration chart is formed of a metal plate defining through grooves or through holes. The images of the through grooves or through holes formed in the metal plate may be read with infrared light accurately. Thus, the positional relationship between image information acquired from the visible light sensor and image information acquired from the infrared light sensor may be determined with increased accuracy.

In a preferred embodiment of this invention, the lens unit is a zoom lens unit, the positional relationship determining device determining, for each magnification set to the zoom lens unit, a positional relationship on the images of the photographic film between the image information acquired from the visible light sensor and the image information acquired from the infrared light sensor.

Sizes of photographic film from which images are read, and print sizes, may be accommodated in a flexible way by using the zoom lens unit to set or vary the magnification of the imaging lens system as noted above. Inventors have found that, when the magnification of the lens is varied, the positional relationship between image information acquired from the visible light sensor and image information acquired from the infrared light sensor varies also. Thus, by determining, for each magnification set to the zoom lens unit, the positional relationship on the images of the photographic film between the image information acquired from the visible light sensor and the image information acquired from the infrared light sensor, an adequate positional association of a visible image and an infrared image may be made even when the magnification of the lens is varied Other features and advantages of this invention will be apparent from the following description of the embodiment to be taken with reference to the drawings.

DESCRIPTION OF THE PREFERRED EMBODIMENTS

Figure 1:
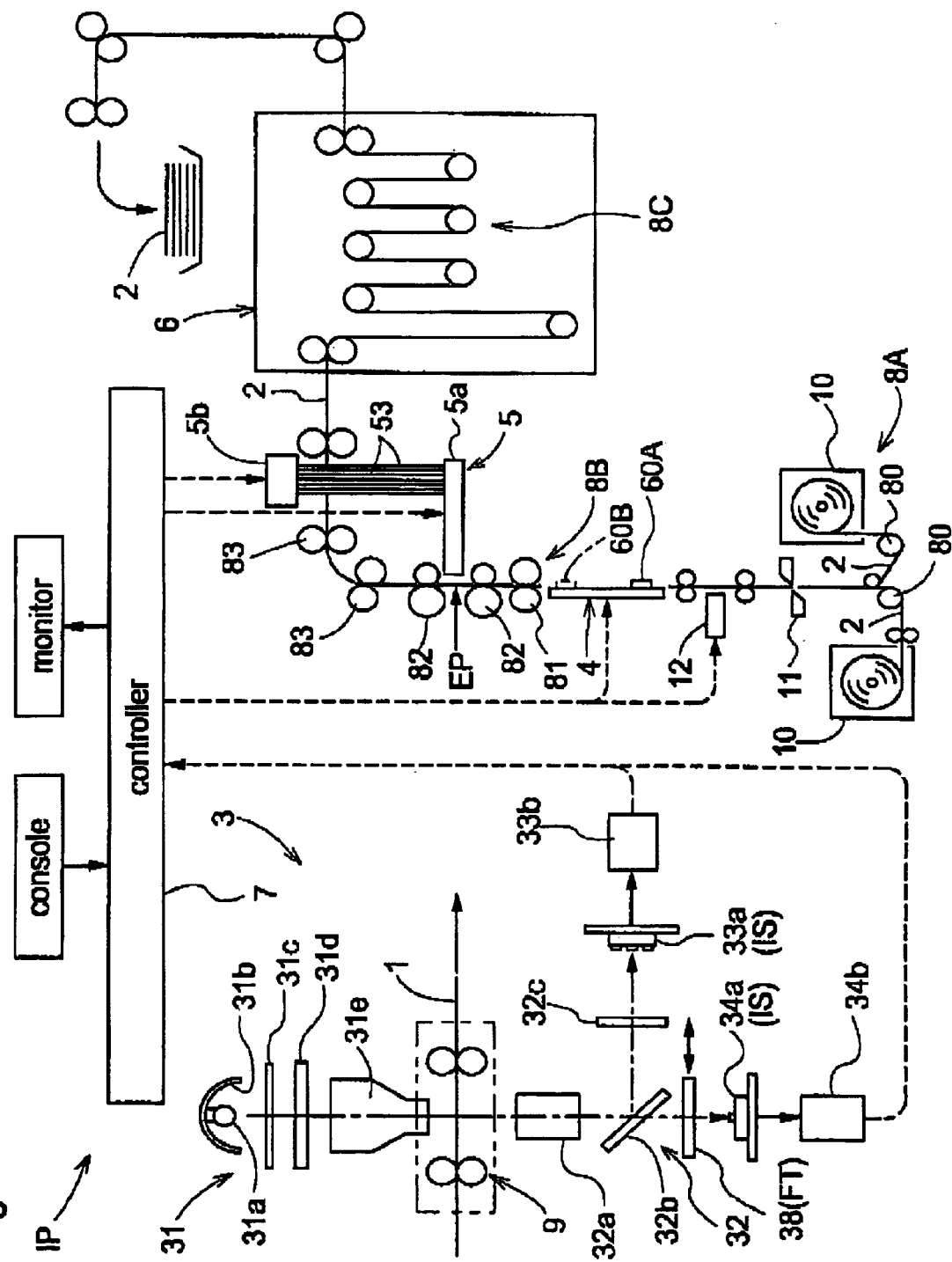
FIG. 1 is a schematic block diagram of an image printer employing this invention.

An image printer IP in an embodiment of this invention is the digital exposure type. As shown in FIG. 1, the image printer IP includes a film scanner 3 acting as a photographic film image reading apparatus for reading frame images, as digital image data, from a photographic film (hereinafter called simply the film) 1 developed by a film developing device not shown, a controller 7 for processing the digital image data acquired to make printing data, a digital printing station 5 for forming, based on this printing data, images corresponding to the frame images on photographic paper 2, and a developing station 6 for developing the exposed photographic paper 2. The photographic paper 2 developed at the developing station 6 is discharged through a drying stage as finished prints.

The film scanner 3 includes, as main components thereof, illuminating optics 31, image pickup optics 32, and an image reading sensor IS using CCD sensors.

The illuminating optics 31 include a halogen lamp 31a acting as a light source, a reflector 31b for reflecting light from the halogen lamp 31a and forming substantially collimated light, an infrared light cut filter 31c, a light adjustment filter 31d for adjusting the light from the halogen lamp 31a to a desired color balance, and a mirror tunnel 31e for uniforming a color distribution and intensity distribution of the light.

The image reading sensor IS of film scanner 3 in this embodiment, as described in detail hereinafter, has a visible light sensor 33a for detecting visible images of the film 1, and an infrared light sensor 34a for detecting infrared images of the film 1. The infrared light sensor 34a acquires conditions of scratches and dust found on the film 1 as image information. Thus, the above optics are required to allow passage of infrared light in a wavelength range to be detected by the infrared light sensor 34a.

Figure 2:
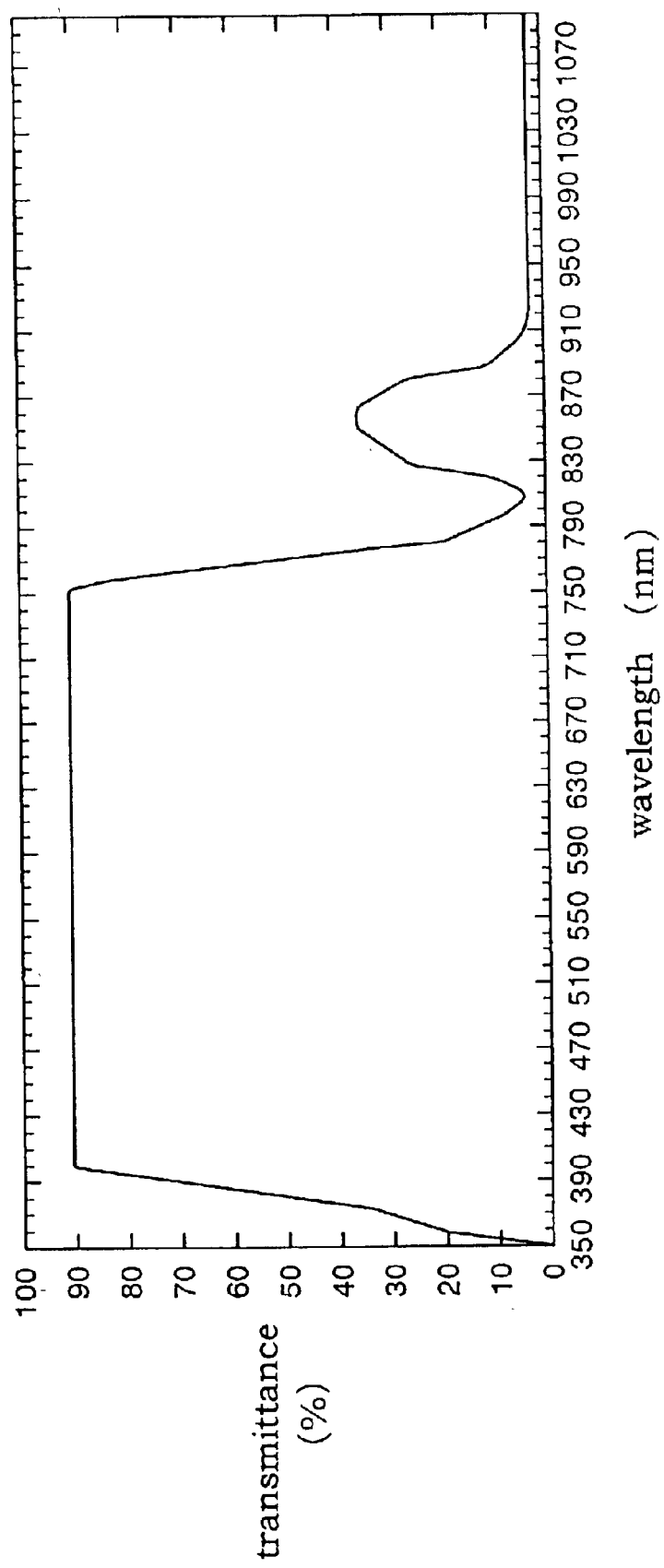
FIG. 2 is a view showing wavelength characteristics of an infrared light cut filter according to this invention.

For this purpose, as shown in FIG. 2, the infrared light cut filter 31c, generally, has low transmittance in an infrared wavelength range of about 780 nm to 1100 nm, but the transmittance is set slightly higher for the wavelength range of about, 820 nm to 890 nm which is to be detected by the infrared light sensor 34a.

Figure 3:
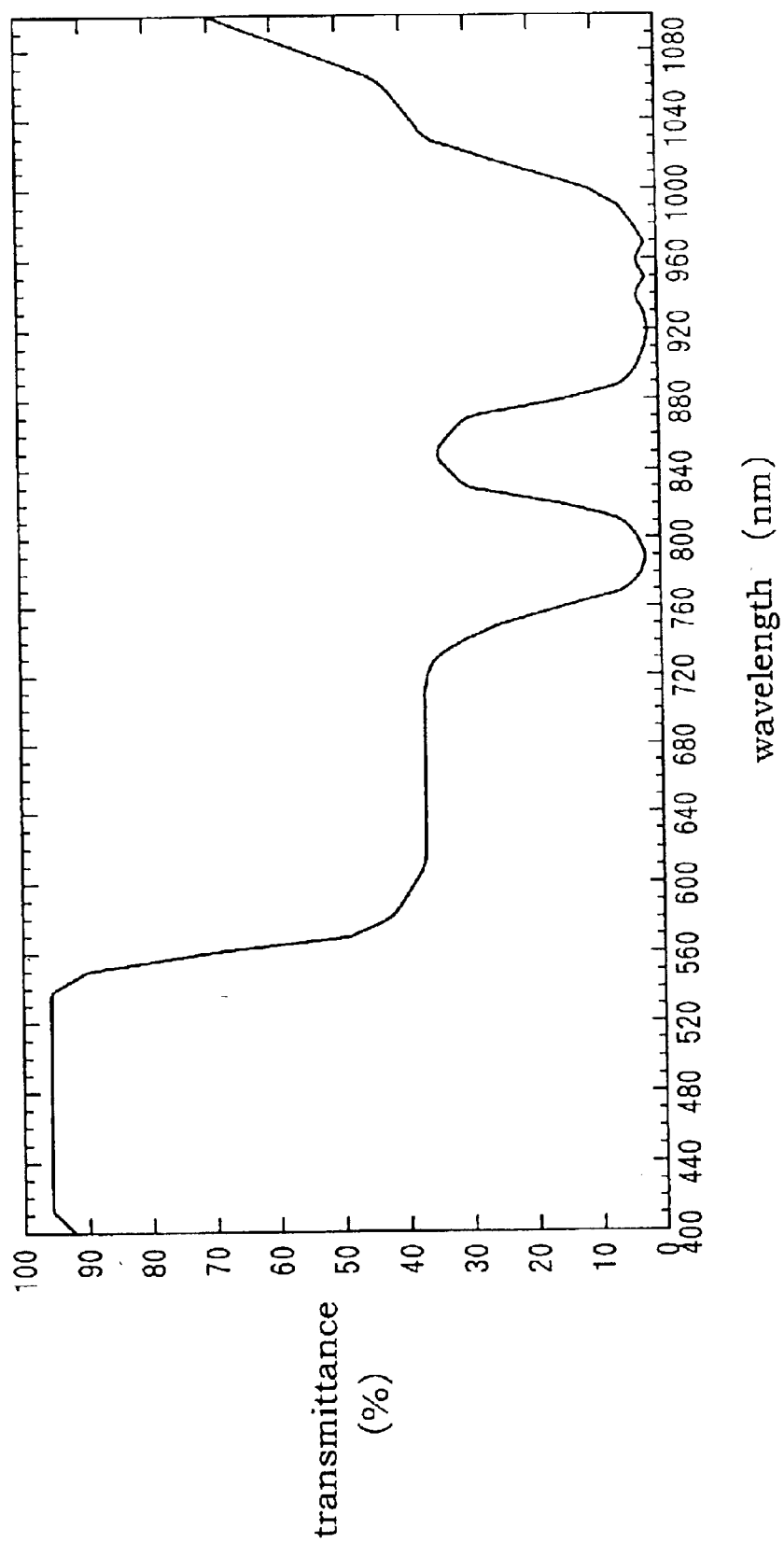
FIG. 3 is a view showing wavelength characteristics of a light adjustment filter according to this invention.

As shown in FIG. 3, the light adjustment filter 31d adjusts the color balance with a predetermined wavelength dependence of transmittance in a visible light region below about 780 nm. The transmittance, generally, is low in the infrared range of about 790 nm to 1000 nm, However, the transmittance is set slightly higher for the wavelength range of about 820 nm to 890 nm which is to be detected by the infrared light sensor 34a.

The image pickup optics 32 include a zoom lens unit 32a for forming the images of film 1 on light-receiving planes of infrared light sensor 34a as well as visible light sensor 33a. a mirror 32b acting as an optical path branching device for deflecting the light, an infrared light cut filter 32c, and a sheet glass 38 acting as focal position varying transparent element FT disposed between the zoom lens unit 32a and infrared light sensor 34a for shifting a focal position in the direction of the optical axis.

The zoom lens unit 32a is operable by the controller 7 to vary magnification in a plurality of stages in response to the size of film 1 and the size of prints to be made. This magnification is divided into a group of lower magnifications around real size and a group of higher magnifications around double size.

The mirror 32b is in the form of a so-called cold mirror. Visible light is reflected by the reflecting surface of mirror 32b to have its path turned 90 degrees to travel to the visible light sensor 33a. On the other hand, a large part of infrared light passes through the mirror 32b to travel straight to the infrared light sensor 34b.

Figure 4:
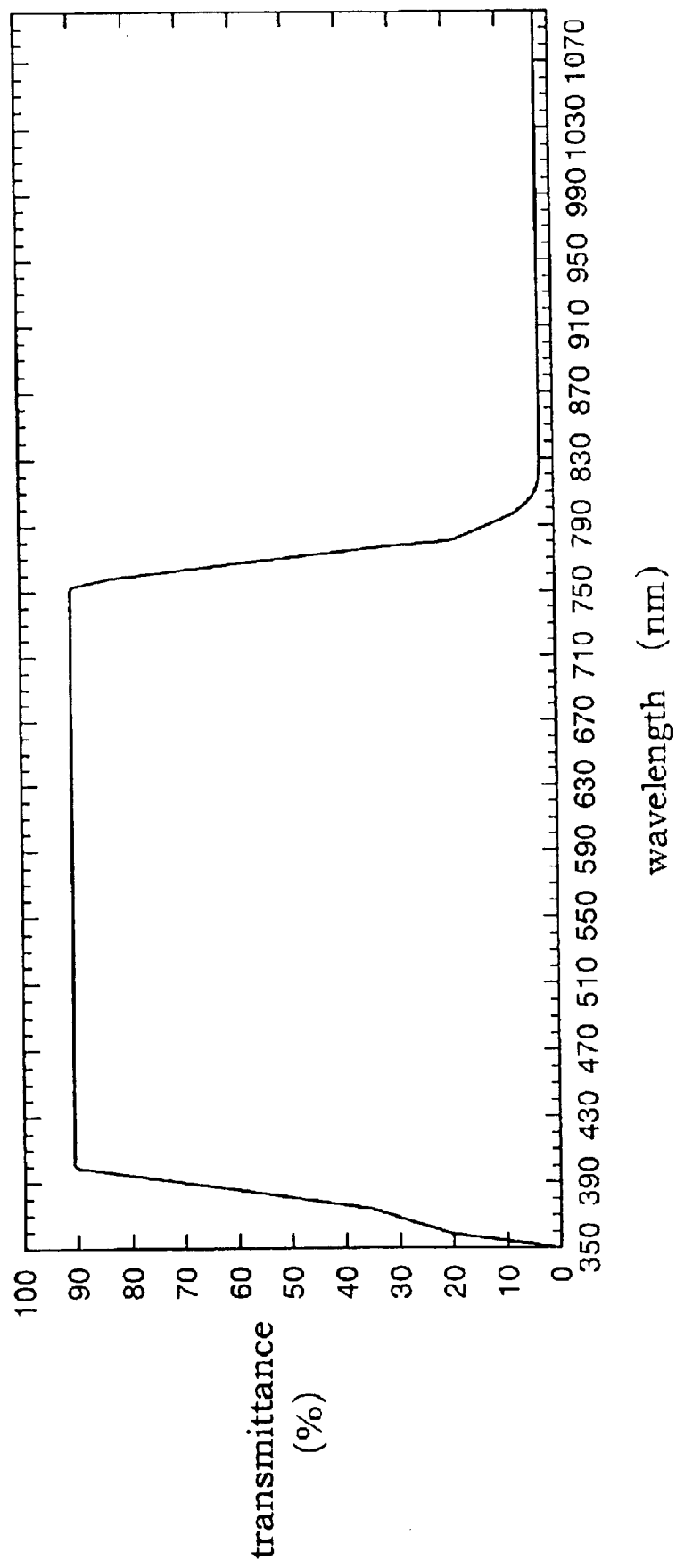
FIG. 4 is a view showing wavelength characteristics of another infrared light cut filter according to this invention.

The infrared light cut filter 32c is provided to reliably remove the small part of infrared light reflected by the mirror 32b. As distinct from the infrared light cut filter 31c of the illuminating optics 31, the filter 32c has sufficiently low transmittance in the infrared wavelength range of about 820 nm to 890 nm, as shown in FIG. 4, to intercept the infrared light traveling to the visible light sensor 33a.

The image reading apparatus (film scanner 3) in the embodiment shown in FIG. 1 has the focal position varying transparent element FT as the best form of implementation.

The sheet glass 38 is employed as the focal position varying transparent element FT in this embodiment. The sheet glass 38 is disposed between the zoom lens unit 31a and infrared light sensor 34a, and movable to a position on the optical path and retractable therefrom by a driving device not shown, in response to variations in the magnification of zoom lens unit 32a.

When the sheet glass 38 is disposed on the film image reading optical path extending from the zoom lens unit 32a to the infrared light sensor 34a, the focal position for forming the images of film 1 shifts away from the zoom lens 32a.

As noted hereinbefore, the zoom lens unit 32a is set to a group of lower magnifications and a group of higher magnifications. When magnification varies in this way, variations in the focal position are sufficiently suppressed for visible light, but the focal position varies slightly for infrared light.

Figure 5A:
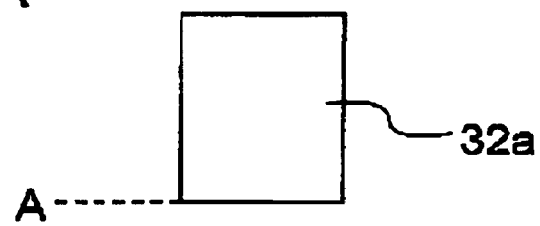
FIGS. 5A and 5B are explanatory views showing positioning of an infrared light sensor according to this invention.
Figure 5A:
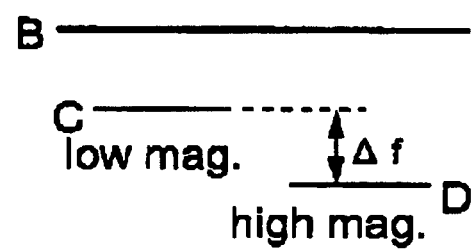

That is, when the position of zoom lens unit 32a is "A" as shown in FIG. 5A, the focal position for the region of visible light is located at "B". This position does not vary when the magnification of zoom lens unit 32a is varied to the above-mentioned group of lower magnifications or group of higher magnifications. For the region of infrared light, on the other hand, a position "C" becomes the focal position when the magnification of zoom lens unit 32a is set to the group of lower magnifications, and a position "D" becomes the focal position when the magnification of zoom lens unit 32a is set to the group of higher magnifications.

Figure 5B:
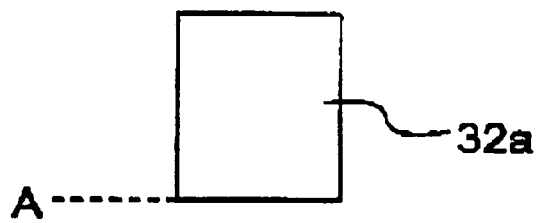
Figure 5B:
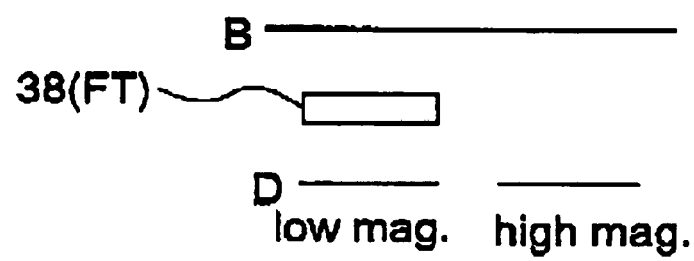

Such variations in the focal position between the group of lower magnifications and the group of higher magnifications are absorbed by moving the sheet glass 38 to and from the film image reading optical path. To describe this more particularly, where the difference ((f) in the focal position between the group of lower magnifications and the group of higher magnifications in FIG. 5A is "0.2 mm", for example, the sheet glass 38 placed on the film image reading optical path may shift the focal position "0.2 mm" away from the zoom lens unit 32a. Then, with the sheet glass 38 placed on the film image reading optical path, as shown in FIG. 5B, the light-receiving plane of infrared light sensor 34a may be set to the position "D" which is the focal position from the group of higher magnifications.

With the infrared light sensor 32a arranged as above, when the zoom lens unit 31a is set to the group of higher magnifications, the light-receiving plane of infrared light sensor 34a becomes the focal position by retracting the sheet glass 38 from the film image reading optical path. On the other hand, when the zoom lens unit 31a is set to the group of lower magnifications, the light-receiving plane of infrared light sensor 34a in the position "D" becomes the focal position by placing the sheet glass 38 on the film image reading optical path in a posture perpendicular to the latter. The sheet glass 38 for shifting the focal position "0.2 mm" away from the zoom lens unit 32a may be realized by setting the following numeric values thereto. Where, for example, the sheet glass 38 has a refractive index n at 1.33, its thickness t may be in the order of 0.6 mm by approximate calculation for a paraxial range.

The visible light sensor 33a performs a photoelectric conversion of visible light in the light beams guided by the image pickup optics 32. This sensor 33a includes CCD line sensors corresponding to the colors of red (R), green (G) and blue (B) and integrated into a single chip. Each CCD line sensor has numerous (e.g. 5,000) light-receiving elements arranged in a main scanning direction, i.e. transversely of the film 1. These light-receiving elements have R, G or B color filters formed on light-receiving planes thereof, respectively.

Detection signals of the visible light sensor 33a are amplified and converted to digital signals by a visible light signal processing circuit 33b to be outputted to the controller 7.

The infrared light sensor 34a has a construction similar to the visible light sensor 33a. However, while the visible light sensor 33a has three CCD line sensors corresponding to RGB colors, the infrared light sensor 34a has only one CCD line sensor for infrared light.

Detection signals of the infrared light sensor 34a are amplified and converted to digital signals by an infrared light signal processing circuit 34b to be outputted to the controller 7.

When frame images of film 1 are set to a predetermined scanning position, a process for reading the frame images is started. As the film 1 is transported in a sub-scanning direction by a film transport mechanism 9, projected light images of the frame images are successively read, each as divided into a plurality of slit images, by the visible light sensor 33a and infrared light sensor 34a. The light images are converted into image signals of RGB color components and image signals of infrared components to be transmitted as raw digital image data to the controller 7. Such operations of the illuminating optics 31, image pickup optics 32 and image reading sensor IS of film scanner 3 are controlled by the controller 7.

Besides the above reading of image data from the film, the film scanner 3 has a function to read, with a magnetic reading head not shown, print sizes and other information magnetically recorded on the film.

The digital printing station 5 in this embodiment employs a PLZT shutter mode. That is, a shutter array of PLZT elements is employed as an exposure head 5a. Each shutter receives RGB color light from a light source unit 5b through an optical fiber bundle 53. This shutter array extends transversely of photographic paper 2, i.e. transversely of a direction of its transport, over two rows of photographic paper 2 transported side by side. When a voltage at a predetermined level is applied to each shutter, the shutter passes light (i.e. is opened). When the voltage application is stopped, the shutter intercepts light (i.e. is closed). Each shutter corresponds to one pixel of an image to be formed. By opening and closing of the shutters, image data for one line extending transversely of the paper transport direction and having a width corresponding, to one pixel is formed at a time.

The light source unit 5b includes, though not shown in the drawings, a light source lamp, a light adjustment filter for adjusting light from the light source lamp to a desired color balance, and a rotating filter. The rotating filter has optical filters of three colors, red (R), green (G) and blue (B), arranged in the circumferential direction. By constantly rotating the rotating filter at a fixed high speed, one of the RGB color filters is selectively opposed to the light source. Light in the selected color is transmitted through that color filter and through the optical fiber to the shutter.

Based on the image information inputted from the film scanner 3, the controller 7 sets a period of time for opening each shutter, which is for each pixel and for each of the RGB exposure colors, as an exposure value, so that the image is properly reproduced on the photographic paper 2.

Known modes available to the digital printing station includes, besides the PLZT shutter mode, a liquid crystal shutter mode, fluorescent beam mode and FOCRT mode. Any one of these modes may be selected according to exposure specifications.

A transport system for transporting the photographic paper 2 to the above digital printing station 5, and transporting the photographic paper 2 exposed at the digital printing station 5 to the developing station 6, as shown in FIG. 1, is divided into a paper feed line 8A for transporting the photographic paper 2 in a single strip, an exposure transport line 8B for transporting the photographic paper 2 in two rows, and a development transport line 8C. A distributing device 4 is disposed between the paper feed line 8A and exposure transport line 8B for distributing strips of photographic paper 2 successively transmitted from the paper feed line 8A into the two rows.

As seen from FIG. 1, the paper feed line 8A includes a plurality of rollers 80 for drawing the photographic paper 2 selectively out of two paper magazines 10 storing the elongate photographic paper 2 rolled with a photosensitive surface thereof facing outward, and transferring the photographic paper 2 to the distributing device 4. The paper feed line 8A further includes a paper cutter 11 disposed halfway along a transport path thereof for cutting the photographic paper 2 drawn out of the paper magazines 10 according to a print size corresponding a region for forming each image. A back printer 12 is disposed downstream of the cutter 11 for printing, on the back (non-emulsion surface) of photographic paper 2, film IDs, frame numbers, and correction information indicating an image processing performed when making printing data. The back printer 12 usually is in the form of a dot impact printer.

Briefly, the exposure transport line 8B includes receiving transport rollers 81 for receiving the photographic paper 2 from the distributing device 4, exposure transport rollers 82 arranged in the transport direction across an exposure position EP of the exposure head 5a, and post-exposure transport rollers 83 arranged further downstream in the transport direction. The receiving transport rollers 81, exposure transport rollers 82 and post-exposure transport rollers 83 can simultaneously transport the photographic paper 2 in the two parallel rows.

The receiving transport rollers 81 are switchable to pinch and support the two separate rows of photographic paper 2, and alternately receive the right and left rows of photographic paper 2 from the distributing device 4.

The exposure transport rollers 82 include upstream exposure transport rollers 82 and downstream exposure transport rollers 82 independently switchable between a pinch state and a release state. Thus, the photographic paper 2 is transported through the exposure position EP in three different states, i.e. transported only by the upstream exposure transport rollers 82, transported by both upstream and downstream exposure transport rollers 82, and transported only by the downstream exposure transport rollers 82. These transport states take place successively in the stated order.

The transport path downstream of the exposure transport rollers 82 is curved with a curved guide not shown, and the post-exposure transport rollers 83 are arranged along this path. The post-exposure transport rollers 83 pinch and hold the two rows of photographic paper 2 having passed and exposed in the exposure position EP.

The photographic paper 2 successively transmitted from an exit area of the paper feed line 8A is distributed by the distributing device 4 to loading areas of the separate rows of exposure transport line 8B. As schematically shown in FIG. 1, the distributing device 4 includes a first chucker 60A and a second chucker 60B independently movable vertically and horizontally.

These first chucker 60A and second chucker 60B, though not seen in the drawings, are capable of pinching and transporting the photographic paper 2. The first chucker 60A transfers the photographic paper 2 received from the downstream end of paper feed line 8A to one of the right and left rows defined by the receiving transport rollers 81. The second chucker 60B transfers the photographic paper 2 received from the downstream end of paper feed line 8A to the other row defined by the receiving transport rollers 81. The first chucker 60A and second chucker 60B are alternately movable vertically to distribute the photographic paper 2 to the transport paths in two rows of exposure transport line 8B.

A print making operation of the image printer IP having the above construction will be outlined next.

First, a film 1 to be printed is loaded into the film scanner 3. As the film 1 is transported by the film transport mechanism 9, each frame image is read from the film 1.

In reading the images from the film 1, the visible light sensor 33a reads proper image information photographed on the film 1 while the infrared light sensor 34a reads image information of scratches and/or dust formed on the film 1, which is not the proper image information photographed on the film 1. The infrared light sensor 34a can read such image information on the following principle. Infrared light incident on the film 1 is not influenced by the photographic images recorded on the film 1. Any scratches or dust present on the film 1 scatter infrared light, thereby reducing the quantity of transmitted light. Consequently, the presence of scratches or dust may be acquired as image information.

When reading the images from the film 1, the magnification of zoom lens unit 32a is varied as appropriate according to the size of film 1 or print sizes as noted hereinbefore. When the zoom lens unit 32a is set to the group of lower magnifications, the sheet glass 38 is placed on the film image reading optical path.

Visible images detected by the visible light sensor 33a and infrared images detected by the infrared light sensor 34a are inputted to the controller 7 through the visible light signal processing circuit 33b and infrared light signal processing circuit 34b, respectively. Based on density information on each color of the visible images inputted from the visible light sensor 33a, the controller 7 determines an amount of exposure for each color, pixel by pixel, of images to be formed by the exposure head 5a.

At this time, any scratches or dust present on the film 1 result in variations, from the density information on the proper images, of density levels of positions where the scratches or dust is/are present on the images detected by the visible light sensor 33a. When an amount of exposure were set in this state, resulting prints would have poor image quality in the positions of scratches or dust.

To cope with such a situation, the controller 7 determines the positions of scratches or dust on the film 1, by using a position correcting formula as described hereinafter, from the information provided by the infrared light sensor 34a. Then, the controller 7 corrects density information corresponding to the positions of scratches or dust and included in the image information detected by the visible light sensor 33a, for example, by compensation with density information on surrounding images. The corrected density information is used to set an amount of exposure.

When an amount of exposure has been set for each pixel as above, the exposure head 5a is driven to form images, with amounts of exposure set, on the photographic paper 2 transported along the exposure transport line 8B through the exposure position EP.

The photographic paper 2 having gone through the exposing process is transported to the developing station 6 to be developed therein. After the drying stage, the photographic paper 2 is discharged as finished prints.

When identifying and correcting the positions of scratches or dust by means of infrared images of the film 1 as noted above, the positions of scratches or dust must be detected with high precision.

Error factors in detecting the positions of scratches or dust include the fact that the effective magnification of zoom lens unit 32a is slightly different for infrared light and visible light.

This difference is corrected by a calibrating operation using a calibration chart 40 as described hereinafter.

Figure 6A:
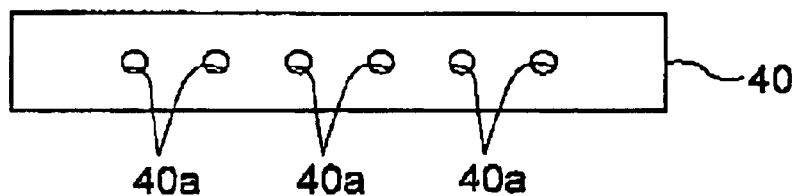
FIGS. 6A through 6C are explanatory views of a calibration chart and images formed thereon.

The calibration chart 40, as shown in FIG. 6A which is a view seen in the direction of thickness of the chart 40, is a thin strip of metal plate defining six through holes 40a of like diameter arranged in a row. In other words, the calibration chart 40 has images of six through holes 40a recorded thereon. Since the calibration chart 40 is in the form of metal plate, the images formed of six through holes 40a are readable with infrared light.

Figure 7:
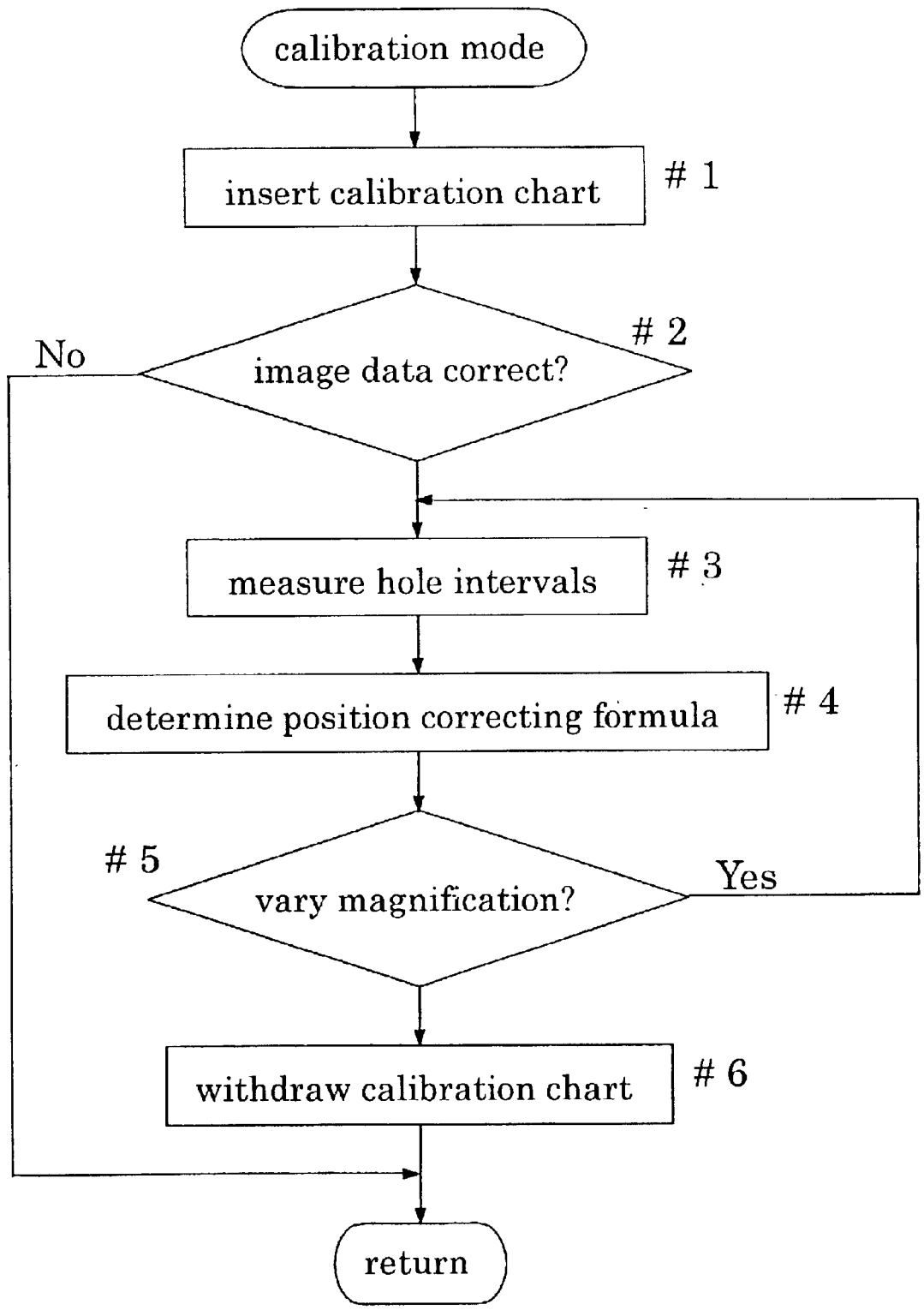
FIG. 7 is a flow chart of operation according to this invention.

The calibrating operation using the calibration chart 40 is carried out by the controller 7 which executes a process outlined in the flow chart of FIG. 7. The process shown in FIG. 7 is started on an instruction to start the calibrating operation, inputted from the console by the operator.

When the operator inputs the instruction to start the calibrating operation, the calibration chart 40 is inserted in a position on the film image reading optical path where the film 1 is placed for reading images therefrom (see FIG. 1) (step #1). At this time, the calibration chart 40 is placed such that the longitudinal direction of chart 40 agrees with the direction of width of the film 1, and the direction of thickness of chart 40 agrees with the optical axis. It is to be noted that the calibration chart 40 is driven by a drive mechanism not shown, to advance to and retract from the position where the film 1 is placed for reading images therefrom.

Figure 6B:
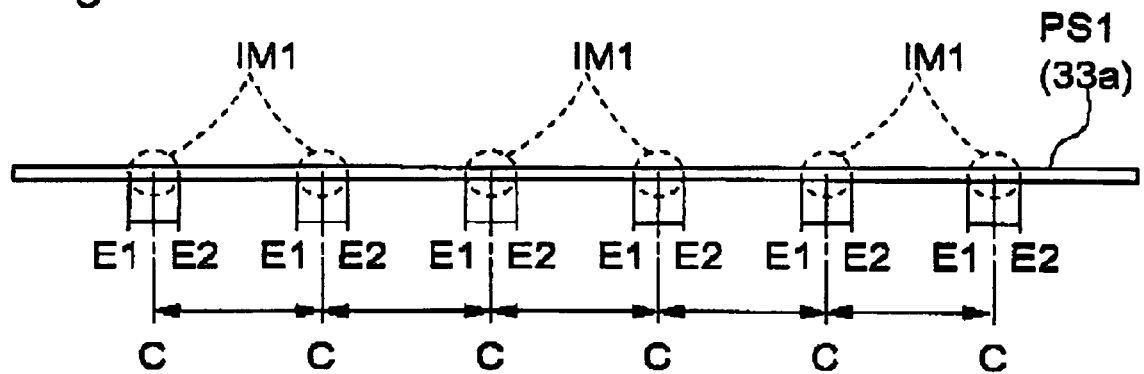

With the calibration chart 40 placed in that position, the zoom lens unit 32a forms images IM1 of through holes 40a, as shown in broken lines in FIG. 6B, on the light-receiving plane of visible light sensor 33a. To facilitate visibility, FIG. 6B shows only one of the line sensors provided for RGB colors, the other two line sensors being omitted.

Figure 6C:
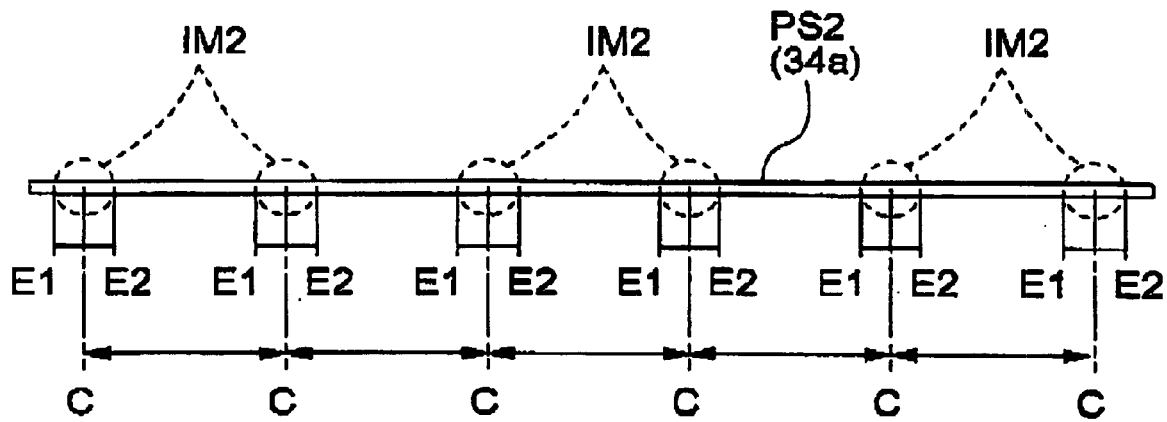

The zoom lens unit 32a forms also images IM2 of through holes 40a, as shown in broken lines in FIG. 6C, on the light-receiving plane of infrared light sensor 34a.

Since the magnification of zoom lens unit 32a is slightly different for visible light and infrared light, there occurs a difference in size of the images of through hole 40a, between the images IM1 on the visible light sensor 33a and the images IM2 on the infrared light sensor 34a. In FIGS. 6B and 6C show the difference in exaggeration for the sake of visibility.

Assume that a light-receiving element array PS1 of visible light sensor 33a and a light-receiving element array PS2 of infrared light sensor 34a are in a positional relationship as shown in FIGS. 6B and 6C. Upon receipt of detection signals of part of the images IM1 and IM2 of through holes 40a detected by the light-receiving element arrays PS1 and PS2, through the visible light signal processing circuit 33b and infrared light signal processing circuit 34b, the controller 7 determines positions of images IM1 and IM2 of through holes 40a from these signals. When the numbers of images IM1 and IM2 are less than a predetermined number (6 in this embodiment), or when the width of image IM1 or IM2 of one through hole 40a is extremely small, the controller 7 determines that the calibration chart 40 is not inserted in the proper posture noted above (step #2), and ends the process. When the data of the images of through holes 40a are found proper, the controller 7 measures intervals between the images of through holes 40a (step #3).

In measuring the intervals between images IM1 and between images IM2 of through holes 40a, as shown in FIGS. 6B and 6C, a midpoint C between edges E1 and E2 of the image IM1 or IM2 of each through hole 40a is determined, and intervals between adjacent midpoints C are measured.

A ratio between the magnification in time of film image reading by the visible light sensor 33a and the magnification in time of film image reading by the infrared light sensor 34a is derived from an average of the intervals between the images IM1 and an average of the intervals between the images IM2. This ratio is used to determine a position correcting formula for determining a positional relationship on the images of film 1 between the image data detected by the visible light sensor 33a and the image data detected by the infrared light sensor 34a (step #4).

This position correcting formula may use, as a reference, a starting end position of image data of each frame (i.e. one of the four corners of each frame image) of film 1 taken from the infrared light sensor 34a into a memory of controller 7, for example. With this reference, the formula may consist in a process, on the basis of addresses in the memory, for converting a position of image data of each pixel in infrared images to a position of a length and breadth ratio changed at the above-noted ratio between the magnification in time of film image reading by the visible light sensor 33a and the magnification in time of film image reading by the infrared light sensor 34a. Thus, the computer 7 acts as a positional relationship determining device for determining, based on the images of calibration chart 40 read by the infrared light sensor 34a, a positional relationship on the images of photographic film 1 between image information acquired from the visible light sensor 33a and image information acquired from the infrared light sensor 34a.

Since the infrared light sensor 34a cannot detect the images photographed on the film 1, the above starting end position of image data of each frame on the film 1 cannot be determined from the detection signals per se of infrared light sensor 34a. However, with reference to the starting end position of image data of each frame derived from the image data taken from the visible light sensor 33a, the starting end position of image data of each frame of infrared images may be determined from position information in the memory of image data taken from the infrared light sensor 34a at the same time as the starting end position of data of each frame of visible images, and the above-noted ratio between the magnification in time of film image reading by the visible light sensor 33a and the magnification in time of film image reading by the infrared light sensor 34a.

The process for determining the position correcting formula as described above is carried out each time the magnification is varied for the zoom lens unit 32a. Thus, the above process is repeated while varying the magnification of zoom lens unit 32a (step #5) until position correcting formulas are obtained for all magnifications. It is not absolutely necessary to determine position correcting formulas for all magnifications to be set. For example, one position correcting formula may be determined for each of the group of lower magnifications and the group of higher magnifications noted hereinbefore.

When all the position correcting formulas have been obtained, the calibration chart 40 is withdrawn from the film image reading optical path (step #6).

(Modified Embodiments)

(1) In the foregoing embodiment, the image reading sensor IS includes the visible light sensor 33a and infrared light sensor 34a for detecting visible light and infrared light separately. These sensors may be integrated into a single sensor with the CCD line sensor for detecting infrared light joined with the CCD line sensors provided for the visible light sensor 33a in relation to RGB colors.

(2) In the foregoing embodiment, the wavelength range of about 820 nm to 890 nm is given as an example of infrared wavelength range detectable by the infrared light sensor 34a. This range is variable with detection characteristics of the infrared light sensor used in the infrared image detecting device.

(3) In the foregoing embodiment, the light source is in the form of halogen lamp 31a which emits both visible light and infrared light. The light source may be a combination of a light source of visible light and one of infrared light, both emitting light into the film image reading optical path.

(4) In the foregoing embodiment, the sheet glass 38 is shown as an example of focal position varying transparent element FT. This transparent element FT may comprise a lens instead.

(5) In the foregoing embodiment, the visible light and infrared light emitted from the halogen lamp 31a concur in the film image reading optical path. However, the visible images and infrared images of film 1 may be detected at different photometric stages. In this case also, the lens of variable magnification set for visible light may be used for the infrared image reading stage.

(6) In the foregoing embodiment, the zoom lens unit 32a is used as the lens of variable magnification. Instead, what is known as a turret type lens of variable magnification may be used, which includes a plurality of single focus lenses arranged on a rotating stage.

(7) In the foregoing embodiment, the calibration chart 40 is in the form of a thin metal plate defining a plurality of through holes 40a. Instead, the chart may be prepared by depositing metal on the base of photographic film 1 to form images of a set pattern. Such calibration chart may be handled as the photographic film 1 is usually handled, in performing the described calibrating operation.

(8) In the foregoing embodiment, the through holes 40a are formed as images recorded on the calibration chart 40. Instead, images may be recorded by forming through grooves cut to edges of a metal plate.

What is claimed is:

1. An apparatus for reading images of a photographic film disposed on an image reading optical path, comprising:
   a light source for emitting visible light and infrared light into the image reading optical path to irradiate said photographic film;
   a magnification-varying lens unit for the visible and infrared light irradiating said photographic film, said magnification-varying lens unit being switchable between a first magnification state and a second magnification state different from the first magnification state providing a magnification smaller than that of the first magnification state;

an optical path branching unit for branching the optical path front said magnification-varying lens unit into a visible light optical path and an infrared light optical path;

a visible light sensor far detecting a visible image based on the visible light traveling along said visible light optical path from said optical path branching unit;

an infrared light sensor for detecting an infrared image based on the infrared light traveling along said infrared light optical path from said optical path branching unit;

the detection by said visible light sensor of the visible image and the detection by said infrared light sensor of the infrared image being effected simultaneously;

said visible light sensor being disposed such that a focal position of said visible image falls on said visible light sensor at both said first magnification, state end said second magnification state;

said infrared light sensor being disposed such that a focal position of said infrared image falls on said infrared light sensor at said first magnification state;

a focal position varying transparent element movable into the infrared optical path between said optical path branching unit and said infrared light sensor in response to switchover of said magnification-varying lens unit from said first magnification state to said second magnification state, so that with the movement of said focal position varying transparent element, the focal position of the infrared image based on said second magnification state of said magnification-varying lens unit is shifted to fall on said infrared sensor, said focal position varying transparent element being movable also away from the infrared optical path between said optical path branching unit on the infrared optical path and said infrared light sensor in response to switchover of said magnification-varying lens unit from said second magnification state to said first magnification state.

2. An apparatus according to claim 1, wherein said magnification-varying lens unit is a zoom lens unit.

3. An apparatus according to claim 1, wherein said focal position varying transparent element is formed of sheet glass.

4. An apparatus according to claim 1, wherein said optical path branching unit comprises a cold mirror.

5. An apparatus for reading images of a photographic film disposed on an image reading optical path, comprising:

a light source for emitting visible light and infrared light into the image reading optical path to irradiate said photographic film;

a magnification-varying lens unit for the visible and infrared light irradiating said photographic film, said magnification-varying lens nun being switchable between a first magnification state and a second magnification state different from the first magnification state providing a magnification smaller than that of the first magnification state;

an optical path branching unit for branching the optical path from said magnification-varying lens unit into a visible light optical path and an infrared light optical path;

a visible light sensor for detecting a visible image based on the visible light traveling along said visible light optical path from said optical path branching unit;

an infrared light sensor for detecting an infrared image based on the infrared light traveling along said infrared light optical path from said optical path branching unit;

the detection by said visible light sensor of the visible image and the detection by said infrared light sensor of the infrared image being effected simultaneously;

said visible light sensor light being disposed such that a focal position of said visible image falls on said visible light sensor at both said first magnification state and said second magnification state;

said infrared light sensor being disposed such that a focal position of said infrared image falls on said infrared light sensor at said first magnification state;

a focal position varying transparent element operable when located on the infrared light path between said optical path branching unit and said infrared light sensor, to move the focal position of the infrared image from the side of said optical path branching unit to the side of said infrared light sensor;

a driving mechanism operable to advance said focal position varying transparent element into the infrared light path between said optical path branching unit and infrared light sensor in response to switchover of said magnification-varying lens unit from said first magnification state to said second magnification state and operable also to retract said focal position varying transparent element away from the infrared light path between said optical path branching unit and said infrared light sensor in response to switchover of said magnification-varying lens unit from said second magnification state to said first magnification state; and said focal position varying transparent element having a thickness and a refractive index selected such that the focal position of the infrared image formed with said magnification varying lens unit being at said second magnification state falls on said infrared light sensor.

* * * * *